US006469491B1

(12) United States Patent
Schultz

(10) Patent No.: US 6,469,491 B1
(45) Date of Patent: Oct. 22, 2002

(54) APPARATUS AND METHOD FOR MEASURING DC LOAD CURRENT OF A SWITCHING POWER SUPPLY

(75) Inventor: Lynn Schultz, Nashua, NH (US)

(73) Assignee: Peco II, Inc., Galion, OH (US)

( * ) Notice: Subject to any disclaimer, the term of this patent is extended or adjusted under 35 U.S.C. 154(b) by 5 days.

(21) Appl. No.: 09/713,735

(22) Filed: Nov. 15, 2000

(51) Int. Cl.[7] .............................................. G01R 19/18
(52) U.S. Cl. ...................................................... 324/120
(58) Field of Search ............................ 324/117 R, 120, 324/771; 363/16, 19, 21.09, 21.13, 41, 55, 93, 131, 132; 323/222, 223, 255, 287, 289, 356, 357; 361/18, 58, 88, 93.4

(56) References Cited

U.S. PATENT DOCUMENTS

| | | |
|---|---|---|
| 3,422,352 A | 1/1969 | Paulkovich |
| 3,500,171 A | 3/1970 | Kusters et al. |
| 5,008,612 A | 4/1991 | Otto |
| 5,053,695 A | 10/1991 | Canter |
| 5,218,182 A | 6/1993 | Vogel et al. |
| 5,416,408 A | 5/1995 | Berkcan et al. |
| 5,428,286 A | 6/1995 | Kha |
| 5,627,740 A | 5/1997 | Johari |
| 5,629,616 A | 5/1997 | Weggel |
| 5,657,211 A | 8/1997 | Brockmann |
| 5,757,625 A | 5/1998 | Schoofs |
| 5,764,047 A | 6/1998 | Massie |
| 5,949,197 A * | 9/1999 | Kastner ...................... 315/291 |
| 5,949,661 A | 9/1999 | Minkkinen |
| 6,016,260 A | 1/2000 | Heeringa |
| 6,111,216 A * | 8/2000 | Stava ...................... 219/130.51 |

FOREIGN PATENT DOCUMENTS

| | | |
|---|---|---|
| CH | 588 670 A | 10/1975 |
| EP | 0 315 597 A | 5/1989 |
| JP | 2000 295841 A | 10/2000 |

OTHER PUBLICATIONS

Yan–Fei Liu et al.; "A New Current Sensing Scheme for Zero–Voltage Switching Phase–Shifted Bridge Converter," IEEE 2000, pp. 567–573.

* cited by examiner

Primary Examiner—N. Le
Assistant Examiner—Etienne P LeRoux
(74) Attorney, Agent, or Firm—Marshall, Gerstein & Borun

(57) ABSTRACT

Current measurement apparatus and methods are disclosed to measure load DC output current on the secondary side of a high frequency transformer in a switched power supply. Current in the primary side of the transformer is detected with a current transformer, which produces a voltage across a resistance proportional to the primary current in the high frequency transformer. Averaging of the voltage across the resistance is performed during periods of power transfer in the high frequency transformer and held by a capacitor until the next period of power transfer. The held voltage is used to determine the true load DC output current on the secondary side of the high frequency transformer by the turns ratio relationship of the secondary current to the primary current of the high frequency transformer. By averaging the voltage only over the periods of power transfer in the transformer, the effects of magnetizing current in the high frequency transformer are negated, thereby affording a more accurate measurement of DC output current.

30 Claims, 6 Drawing Sheets

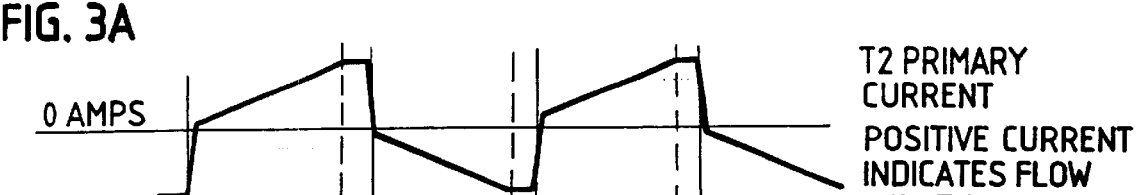

FIG. 3A — T2 PRIMARY CURRENT
POSITIVE CURRENT INDICATES FLOW INTO THE DOT TERMINAL OF T2

FIG. 3B — T2 PRIMARY VOLTAGE
DOT TERMINAL WITH RESPECT TO NON-DOT TERMINAL

FIG. 3C — VOLTAGE AT R1 WITH RESPECT TO SIGNAL GROUND

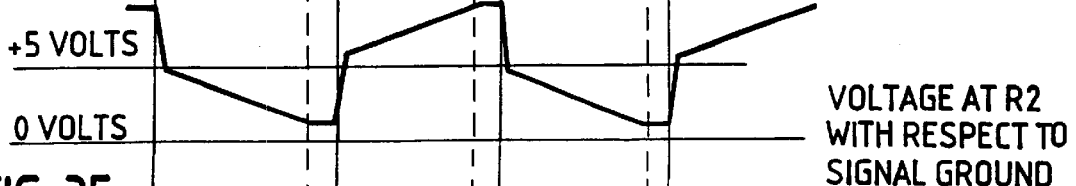

FIG. 3D — VOLTAGE AT R2 WITH RESPECT TO SIGNAL GROUND

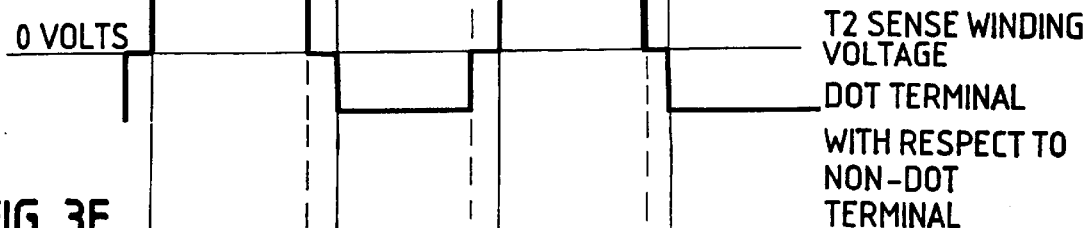

FIG. 3E — T2 SENSE WINDING VOLTAGE
DOT TERMINAL WITH RESPECT TO NON-DOT TERMINAL

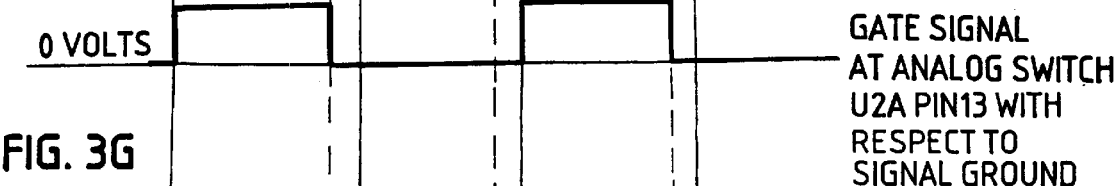

FIG. 3F — GATE SIGNAL AT ANALOG SWITCH U2A PIN13 WITH RESPECT TO SIGNAL GROUND

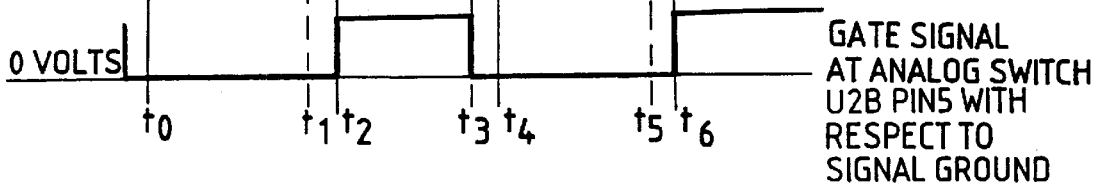

FIG. 3G — GATE SIGNAL AT ANALOG SWITCH U2B PIN5 WITH RESPECT TO SIGNAL GROUND

FIG. 5A

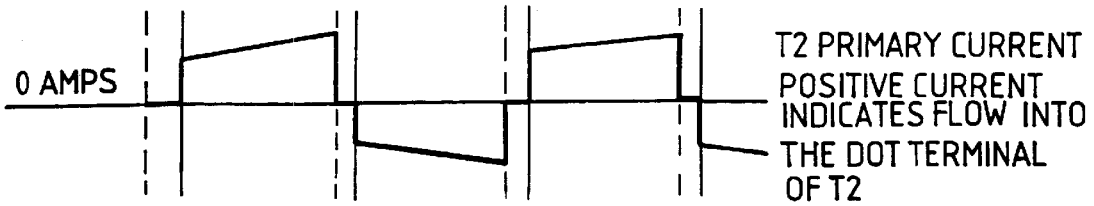

T2 PRIMARY CURRENT POSITIVE CURRENT INDICATES FLOW INTO THE DOT TERMINAL OF T2

FIG. 5B

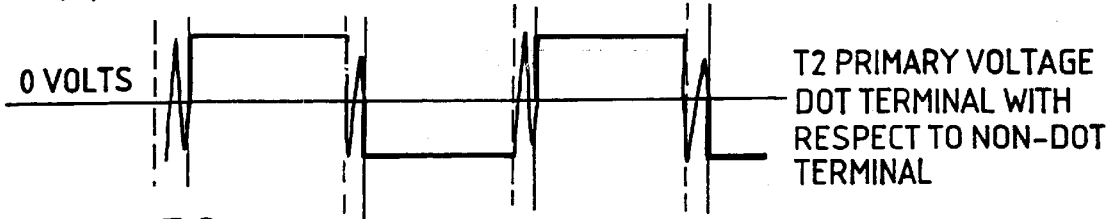

T2 PRIMARY VOLTAGE DOT TERMINAL WITH RESPECT TO NON-DOT TERMINAL

FIG. 5C

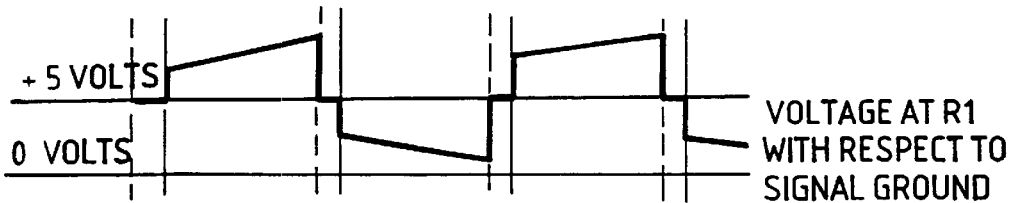

VOLTAGE AT R1 WITH RESPECT TO SIGNAL GROUND

FIG. 5D

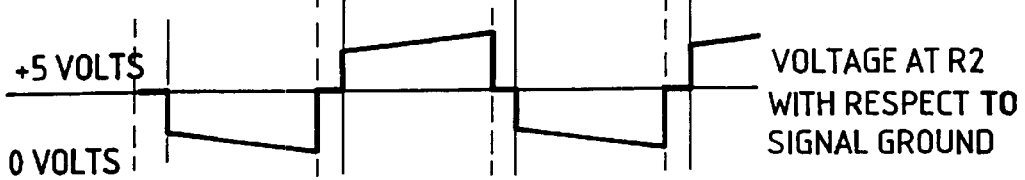

VOLTAGE AT R2 WITH RESPECT TO SIGNAL GROUND

FIG. 5E

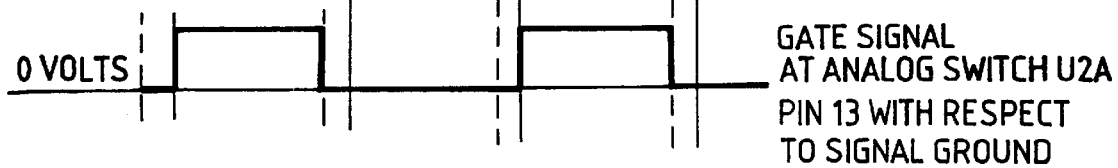

GATE SIGNAL AT ANALOG SWITCH U2A PIN 13 WITH RESPECT TO SIGNAL GROUND

FIG. 5F

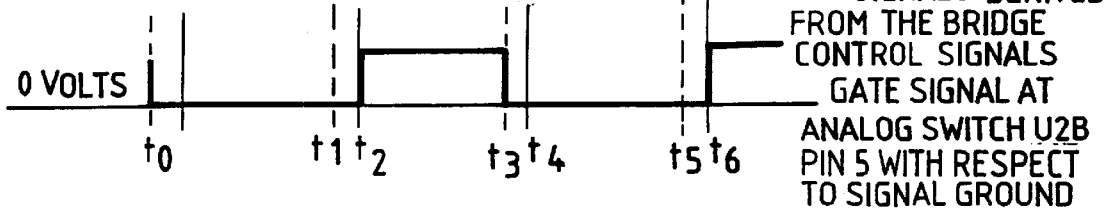

GATE SIGNALS DERIVED FROM THE BRIDGE CONTROL SIGNALS GATE SIGNAL AT ANALOG SWITCH U2B PIN 5 WITH RESPECT TO SIGNAL GROUND

APPARATUS AND METHOD FOR MEASURING DC LOAD CURRENT OF A SWITCHING POWER SUPPLY

FIELD OF THE INVENTION

The present invention relates generally to measuring load current in a switching power supply and, more particularly, to an apparatus and method for measuring DC load current of a switching power supply.

BACKGROUND OF THE INVENTION

Many applications have need for accurate measurement of DC load current on the secondary side of a power transformer used in a switching power supply. For example, accurate measurement of current output to a battery in a battery charger is essential for ensuring proper charging of the battery within its particular parameters. Typically for power supplies having a switching power supply input and a high frequency step-down power transformer the output DC current on the secondary side of the power transformer is monitored by a current shunt resistor or a Hall-effect transducer wired to the output circuit in order to derive an accurate linear measurement. On high current supplies, however, current shunt resistors become large, bulky and result in power dissipation of a portion of the output power. Additionally, Hall-effect transducers are expensive and wiring such transducers into a high-current circuit, for example, poses additional design and manufacturing problems.

An alternative approach to the above methods of measuring output DC current includes monitoring the primary current of the high frequency power transformer by using an inexpensive current transformer and determining the output DC load current of the power transformer relating the current induced on a secondary side of the current transformer to the DC load current according to the turns ratios of the power and current transformers. This approach, however, becomes problematic during short-circuit conditions. In addition, the primary current contains reflected secondary DC output current as determined by the turns ratio of the power transformer added to the magnetizing current within the core of the power transformer. Also, the primary current is typically pulse-width modulated in order to regulate output voltage to the power supply. Hence, simply placing a current transformer on the primary side is problematic because simple rectification and averaging of the primary current produces a nonlinear transfer function (i.e., a function relating the measured primary current to the output load current) with respect to the actual load current as the duty cycle of the pulse-width modulation varies. Furthermore, given light loads on the secondary side of the transformer, the magnetizing current becomes large compared to the secondary current reflected to the primary and, thus, simple rectification may result in large errors.

Attempts to cure the noted problems above have included peak detection rather than simple rectification and averaging of the primary current. Again, however, measurement errors result when the duty cycle changes due to a corresponding change in the magnetizing current amplitude within the power transformer. Similarly, peak detection also suffers from large errors at light loads due to the effects of transformer magnetizing current.

BRIEF DESCRIPTION OF THE DRAWINGS

FIGS. 3A–3G illustrate current and voltage wave forms occurring at various points in the circuit of FIG. 2.

FIGS. 5A–5F illustrate various voltage and current waveforms occurring at various points in the circuit of FIG.4.

DESCRIPTION OF THE PREFERRED EMBODIMENTS

Figure 1:
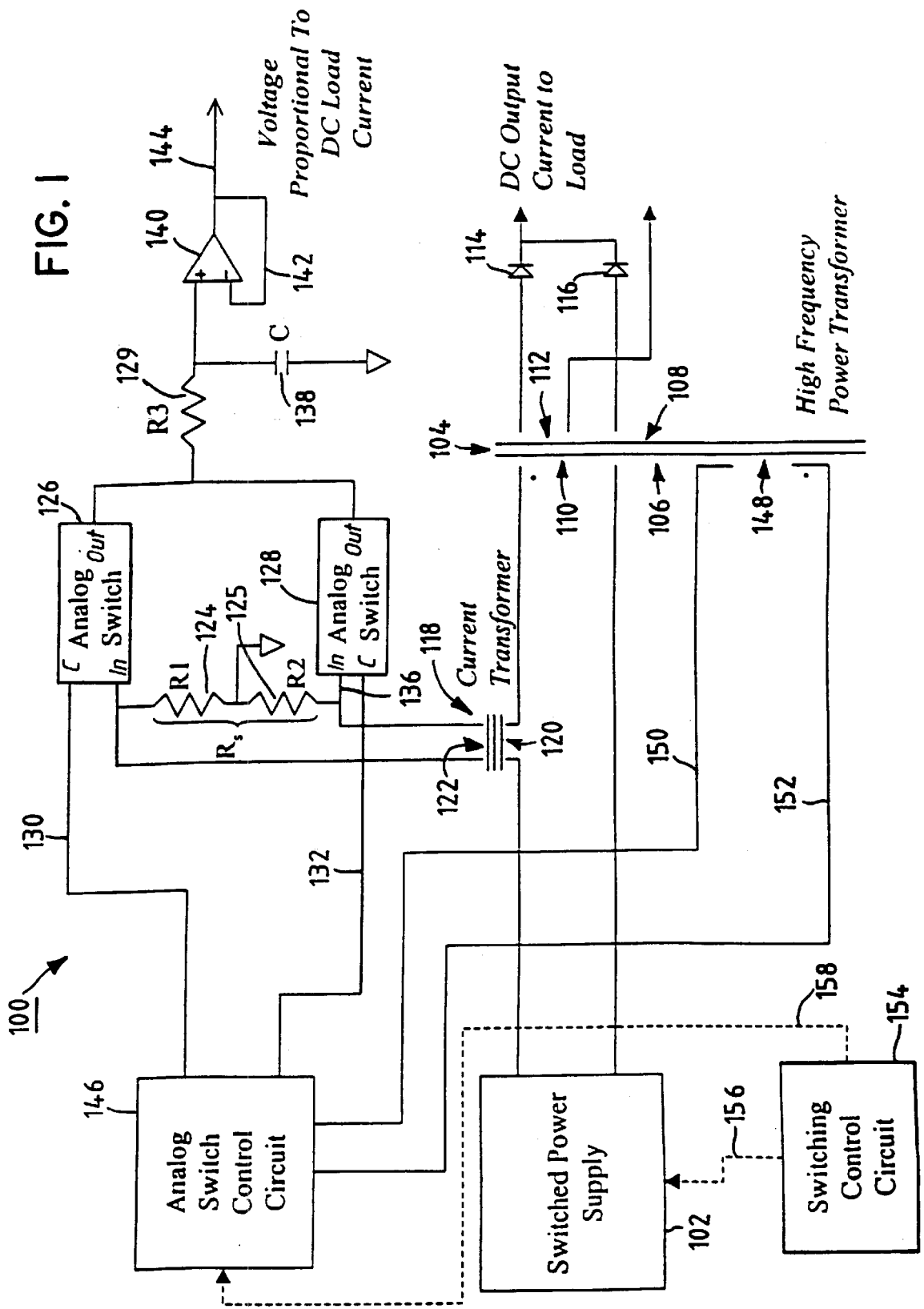
FIG. 1 is a schematic illustration of a power supply circuit constructed in accordance with the teachings of the present invention.

A system for measuring current constructed in accordance with the teachings of the present invention is shown generally at 100 in FIG. 1. A switched power supply 102 delivers power to a primary side 106 of a high frequency power transformer 104. Specifically. the switched power supply 102 is connected to a primary winding 110 of the high frequency transformer 104. A secondary side 108 of the high frequency power transformer 104 includes a secondary winding 112, the output of which is rectified using diodes 114 and 116 to output a DC current to a load (not shown). A current transformer 118 is connected in series with the high frequency power transformer 104. Specifically, a primary winding 120 of the current transformer 118 is connected between the switched power supply 102 and an input to the primary winding 110 of the power transformer 104.

On the secondary side of the current transformer 118, a secondary winding 122 is connected to a sensing resistance $R_s$ comprised of resistors R1 (124) and R2 (125) with a ground potential connection at the connection of these resistors. An alternating current induced in the secondary winding 122 of the current transformer 118 creates alternating polarity voltage drops across the resistors (124 or 125) of the sensing resistance $R_s$ depending on the direction of current flow through the resistance 124. The ends of the sensing resistance $R_s$ are respectively connected to analog switches 126 and 128, which, when switched to an "ON" state, deliver the voltage present at inputs 134 and 136 to the corresponding outputs of the switches 126 and 128. The analog switches 126 and 128 are preferably CMOS analog switches, which afford fast switching time that is necessary to effectively and quickly deliver voltage to the averaging and hold circuit.

The averaging and hold circuit includes an operational amplifier 140, a resistor 129 and a capacitor 138, which is connected between a non-inverting input (+) of the operational amplifier 140 and ground potential. The outputs of the analog switches 126 and 128 are both connected to the non-inverting input (+) of the operational amplifier 140 via the resistor 129. The operational amplifier 140 has unity gain as set by employing a direct feedback connection 142 from an output 144 of the operational amplifier 140 to an inverting input (−) of the operational amplifier 140. The capacitor 138 and resistor 129 are used to average and hold the voltage output from either analog switch 126 or 128. The averaged voltage is delivered to the non inverting input of operational amplifier 140 with respect to ground. The averaged voltage is held on the capacitor 138 when both analog switches 126 and 128 are open since the input resistance of the operational amplifier 140 is very high; thus little current flows out of the capacitor 138.

The analog switches 126 and 128 are controlled at a control input C by an analog switch control circuit 146. The switches 126, 128 and control circuit 146 are connected via connections 130 and 132. In the illustrated circuit 100, the analog switch control circuit 146 receives inputs from a sense winding 148 which is magnetically coupled to the primary side 106 of the high frequency power transformer 104. Based on the alternating voltage delivered to the power transformer 104, voltage is induced in the sense winding 148 alternately on leads 150 and 152, which connect the sense winding 148 to the analog switch control circuit 146. Alternate control signals corresponding to the alternately induced voltages are supplied on lines 130, 132 such that the analog switches 126, 128 are alternately switched to deliver positive voltages that are present at corresponding time periods at the ends of the sensing resistance $R_s$ to the operational amplifier 140 dependent on the direction of current flow in the resistors 124 and 125 comprising the sense resistance $R_s$.

An alternate control arrangement (indicated by dashed lines in FIG. 1) may include an input 158 from a switching control circuit 154, which is used to drive the switched power supply 102 by line 156 in lieu of the sense winding 148. This alternate arrangement is desirable, for example, when the switched power supply 102 is a pulse-width modulated bridge power supply controlled with signals from the switching control circuit 154. In this alternate arrangement, the analog switch control circuit 146 issues control signals via lines 130, 132 to analog switches 126, 128 to correspond with the driving signals delivered by the switching control circuit 154 to the power supply 102 such that the analog switches 126, 128 are alternately switched to deliver voltage created across respective resistors 124 and 125 of the sense resistance $R_s$ via the averaging circuit composed of resistor 129 to the operational amplifier 140 and capacitor 138.

In the following discussion, further specific implementations of the arrangement of FIG. 1 and their operation will be discussed. In particular, FIGS. 2 and 3A–3G will be used to describe an implementation utilizing a sense winding as described above. FIGS. 4, 5A–5F, and 6 describe implementations employing a control arrangement that controls the analog switches with control circuitry synchronized with pulse-width modulated bridge control signals driving the switch power supply.

Figure 2:
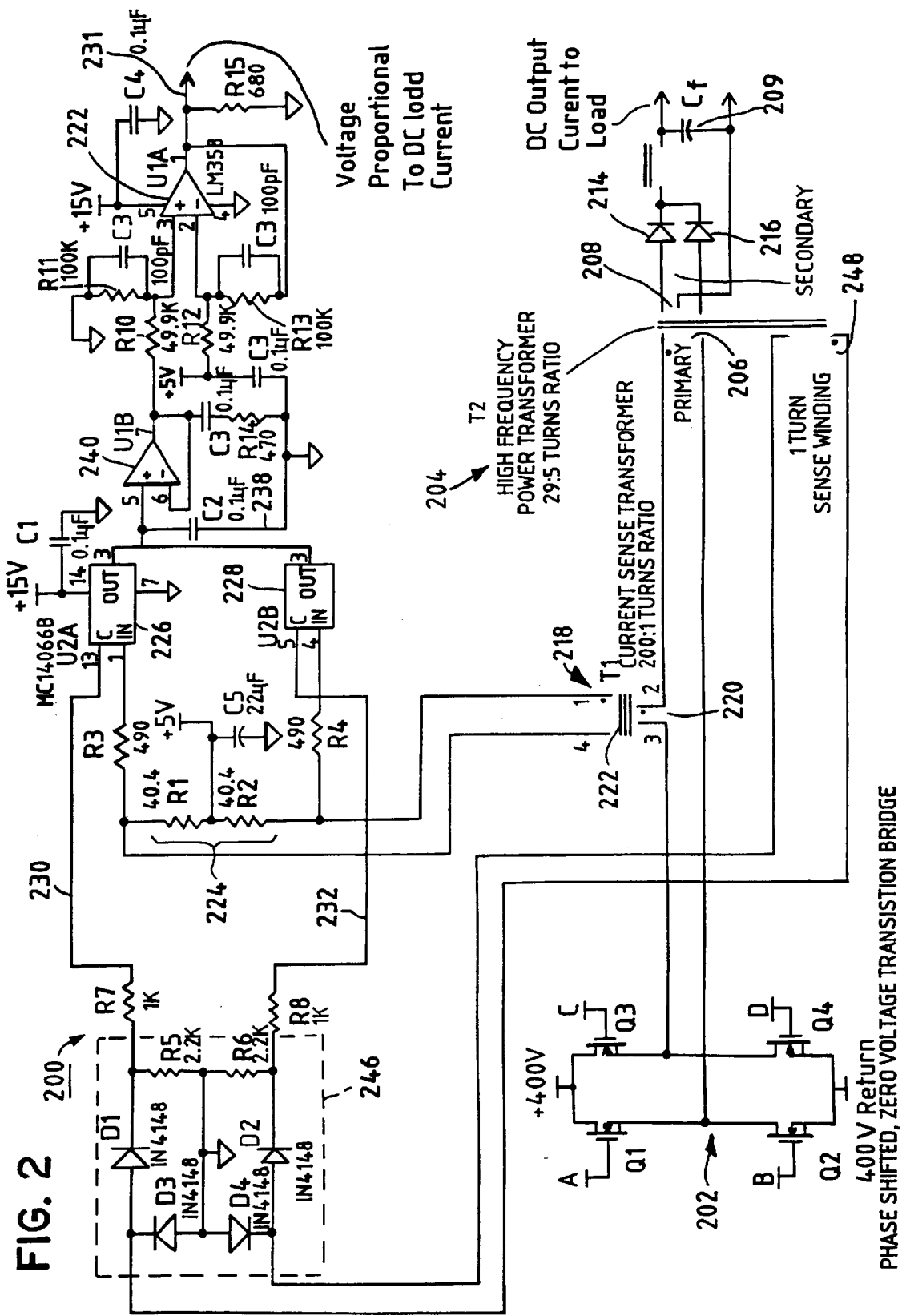
FIG. 2 is a schematic illustration of another power supply circuit constructed in accordance with the teachings of the invention and using a transformer sense winding to control measurement of DC current output.

A power supply circuit 200 constructed in accordance with the teachings of the invention is shown generally in FIG. 2. Within this circuit, a phase-shifted, zero voltage transition bridge 202 is used to deliver power to a high frequency power transformer 204 having a primary winding 206 and a secondary winding 208. In the particular circuit shown, the power transformer has a 29:5 turns ratio of the primary to secondary turns. The secondary winding 208 is connected to a full-wave rectifier implemented by diodes 214, 216, a choke 211 and a capacitor 209. The diodes 214, 216 function to convert the output current to a DC current. The choke 211 and capacitor 209 function to smooth and filter the DC output current. The DC output current is delivered to a load (not shown).

In series with the connection between the phase-shifted, zero voltage bridge 202 and the high frequency power transformer 204 is a current sense transformer 218. In particular, a primary winding 220 of the current sense transformer 218 is connected in one of the legs between the bridge 202 and the transformer 204. The current sense transformer 218 has a secondary winding 222 connected to a sense resistance 224 comprising resistors R1 and R2 connected in series. Resistors R1 and R2 are preferably equal to one another and each can also be conceptually referred to as a sense resistance $R_s$. The current sense transformer 218 shown in FIG. 2 has a turns ratio of the primary winding to the secondary winding of 1:200, but may utilize other turns ratios as desired. It will also be appreciated by those of ordinary skill in the art that the current sense transformer 218 may either be directly connected in series in the leg between the bridge 202 and the transformer 204 or may be implemented by a toroidal current sense transformer, for example, that is placed around the wire comprising the leg between the bridge 202 and the transformer 204.

Since, in the particular example illustrated in FIG. 2, a negative voltage source is assumed as not being available to drive the electronic components, a biased voltage (e.g., 5 volts DC) is applied to a midpoint connection of resistors R1 and R2 in order to ensure proper operation of analog switches 226, 228, which require a positive voltage input when the switches 226, 228 are driven between ground voltage and 15 volts. The biased voltage causes the voltage across each of the resistors R1 and R2 to alternate above and below an offset voltage (i.e., the voltage level of the biased voltage). Connected to the opposing ends of the sense resistance 224 are resistors R3 and R4 for delivering the voltage present across each corresponding sense resistance $R_s$ (i.e., resistor R1 or R2) to the corresponding inputs of analog switches 226, 228 (and also to set a time constant $\tau$ for charging capacitor 238, as will be discussed later). A voltage drop across the sense resistances $R_s$ (i.e., resistors R1 or R2) is created when a current induced in the secondary winding 222 of the current sense transformer 218 flows through the resistors. This voltage drop is related to the DC output current to the load by the turns ratios of the transformers 204 and 218 as will be described below.

The circuit 200 includes a one-turn sense winding 248. The "dot" convention of the sense winding 248 indicates a positive voltage occurs at the dot terminal coincident with a positive voltage at the dot terminal of the primary winding 206. This one-turn sense winding 248 is magnetically coupled to the primary of the high frequency power transformer 204 and is used to drive the analog switch control circuit 246. Persons of ordinary skill in the art will appreciate that, although a one-turn sense winding is preferable, windings having more than one-turn could also be employed.

The analog switch control circuit 246 receives inputs from the one-turn sense winding 248. Control circuit 246 employs a full-wave rectifier comprised of diodes D1, D2, D3, and D4 to ensure that a positive voltage is delivered alternately to analog switch 226 via line 230 and to analog switch 228 via line 232. Each of these lines 230, 232 includes a resistance R7 and R8, which respectively limit the current input to the control inputs of the analog switches 226, 228. According to the dot convention of the one-turn sense winding 248, a control voltage is sent to analog switch 226 when the voltage at the dot terminal of the primary winding 206 is positive. On the other hand, a voltage is sent to analog switch 228 when a reverse voltage is supplied on the opposite end of the primary winding 206 from the dotted terminal in the next half-cycle.

Each of the outputs from the analog switches 226 and 228 are input to a non-inverting terminal (+) of the operational amplifier 240. A capacitor 238 is connected between the non-inverting terminal of the operational amplifier 240 and ground. The capacitor 238 along with resistors R3 and R4 serve to average and hold the voltages switched through analog switches 226 and 228. Since the input impedance of the operational amplifier 240 is very high, the capacitor 238 has virtually no leakage current path and holds the charge voltage when analog switches 226 and 228 are open. Additionally, the operational amplifier 240 is configured to have unity gain as indicated by the direct feedback connection from the output of the operational amplifier 240 to an inverting input (−) of the amplifier 240. Hence, the combination of the capacitor 238, resistors R3 and R4 and the operational amplifier 240 serves as an average and hold circuit averaging the voltages alternately output from the analog switches 226 and 228. Additionally, the resistors R3 and R4 determine the time constant τ for charging of the capacitor 238. The configuration shown in the instant embodiment utilizes two resistors R3 and R4 located at the inputs of the analog switches 226 and 228, but the circuit could alternatively be implemented with a single resistor on the output side of the switches 226 and 228, as was illustrated in FIG. 1 (i.e., resistor 129).

The circuit 200 further includes a differential amplifier 222 that is used to remove the five volt offset on the voltage held on the capacitor 238 that is introduced by the bias voltage connected to resistors R1 and R2. The gain of this differential amplifier 222 is set by the combination of resistors R10 and R11 or R12 and R13. In the circuit 200 illustrated in FIG. 2, the gain of amplifier 222 is R11/R10 (e.g., 100 kΩ/49.9 kΩ). The output of the operational amplifier 240 is input to the non-inverting input (+) of the differential amplifier 222 via the resistor network comprised of resistors R10 and R11. On the inverting input (−) of the differential amplifier 222, a five volt source is input via resistor network R12 and R13. Hence, when the output of the operational amplifier 240 exceeds the five volt reference input to the non-inverting terminal of the differential amplifier 222, a signal is output at output 231 that has a gain of R11 divided by R10 that is applied to the input voltage from operational amplifier 240. The voltage of the signal output at 231 is proportional to the DC load current output on the secondary side 208 of the high frequency transformer 204 as determined by the following transfer function of output voltage (V) of the current measurement circuit divided by the current ($I_o$) output on the secondary winding of the transformer 204:

$$V/I_o = n_1 \cdot n_2 \cdot R_s \cdot G$$

where $n_1$ is equal to the turns ratio of the number of secondary turns to primary turns of the high frequency power transformer (e.g., 5/29), $n_2$ is equal to the turns ratio of the primary number of turns to secondary number of turns on the current sense transformer 218 (e.g., 1/200), and $R_s$ is equal to the value of R1 or R2 based on the assumption that these values are equal (e.g., 46.4 Ohms in the present example). In addition, in the example of FIG. 2 this value must be further multiplied by the gain G of the differential amplifier 222 (e.g., 100 kΩ/49.9 kΩ) to remove the introduced five volt bias voltage. Hence, for this example the value of V is equal to 80 mV per DC output ampere (i.e., V=(5/29)·(1/200)·46.4Ω·(100 kΩ/49.9 kΩ)=80 mV/DC output ampere).

In operation, the phase-shifted, zero voltage transition bridge 202 delivers a modified square wave signal to the primary 206 of transformer 204. FIG. 3B illustrates the voltage waveform present in the primary winding 206. At time $t_0$ the voltage instantaneously achieves a voltage level of the input voltage from the phase-shifted, zero voltage transition bridge 202. In contrast, the current in the primary winding 206 rises gradually as illustrated in FIG. 3A. Simultaneously, current induced in the primary winding of the current transformer 218 follows the wave form of the current in the primary winding 206 of transformer 204 and, accordingly, the voltage across resistance R1 follows the same waveform of FIG. 3A as illustrated in FIG. 3C. In particular, the voltage across resistance R1 rises since the current flows from terminal 4 to terminal 1 of the current sense transformer 218 according to the indicated dot convention. Conversely, the voltage across resistance R2 decreases between time $t_0$ and $t_1$, such that the voltage across resistor R2 falls below the 5 volt bias voltage as shown in FIG. 3D.

Sense winding 248 is synchronized with the voltage on the primary winding 206 of the transformer 204 as illustrated in FIG. 3E. As a result, a positive voltage signal is delivered from the control circuit 246 via line 230 to the analog switch 226 at the time period starting at $t_0$ as shown in FIG. 3F.

At time $t_1$ the phase-shifted, zero voltage transition bridge returns to zero volts prior to reversing current at its output, which occurs at time $t_2$. The voltage in the primary winding 206 of the transformer 204 is driven to zero volts as illustrated in FIG. 3B. Since the primary winding 206 is an inductive winding, the primary current in this winding does not change instantaneously at time $t_2$, as illustrated in FIG. 3A. Similarly, the voltages across R1 and R2 illustrated in FIGS. 3C and 3D, respectively, plateau at time $t_1$ prior to reversing at time $t_2$. Since the sense winding 248 is only a single turn, the voltage across this winding 248 may change essentially as quickly as the voltage changes from the zero voltage transition bridge 202. Hence, at time to the gate signal to analog switch 226 via line 230 ceases and the analog switch 226 is turned off. It is noted that during this time (i.e., from time $t_0$ to time $t_1$) when switch 226 was on, capacitor 238 charges according to the time constant τ=R3× (capacitance of capacitor 238) and this voltage is accordingly averaged and held, and also output by operational amplifier 240 to the differential amplifier 222. It should be noted that the time constant τ is substantially greater than the switching period of the bridge in order to truly average the voltage applied from the analog switches.

At the start of the next half cycle (i.e., time $t_2$), the voltage reverses across the primary winding 206 of the transformer 204 and current in the primary winding 206 begins to reverse, which is illustrated in FIG. 3A. Simultaneously following the primary 206 voltage, the voltage across the one-turn sense winding 248 reverses as illustrated in FIG. 3E.

Accordingly, a gate signal is delivered to analog switch 228 via line 232 as illustrated in FIG. 3G thereby turning on analog switch 228, which, in turn, allows the voltage across R2 to be output to the averaging and holding circuit that includes the operational amplifier 240, capacitor 238 and resistor R4. Since the current in the current sense transformer 218 reverses, the voltage across resistance R2 increases above the 5 volt bias voltage as illustrated in FIG. 3D and voltage across resistance R1 decreases below the 5 volt bias voltage as shown in FIG. 3C.

At time $t_3$ the phase-shifted, zero voltage transition bridge 202 drives the voltage in the primary winding 206 to zero volts and the control signal generated by the one-turn sense winding 248 returns to zero as shown in FIG. 3E. Thus, the gate signal to analog switch 228 returns to zero volts as illustrated in FIG. 3G and switch 228 turns off. At time $t_4$ a full cycle is complete and the process then repeats for the next and subsequent cycles.

When the voltage supply used is a pulse-width modulated bridge, ringing generally occurs during switching of transistors within the pulse-width modulated bridge. As shown in FIG. 5B, for example, transition periods in a pulse-width modulated bridge(i.e., time $t_1$ to time $t_2$ and time $t_3$ to time $t_4$) introduce transient voltages within the primary winding of the power transformer. Accordingly, when using a pulse-width modulated bridge with a measurement circuit similar to that taught in FIGS. 1 and 2, the use of a one-turn, sense winding such as winding 248 becomes untenable due to the lack of clean switching between voltage states. Accordingly, another approach for switching the analog switches is needed when using a pulse-width modulated bridge. One such approach is illustrated in FIGS. 4 and FIGS. 5A–5F.

Figure 4:
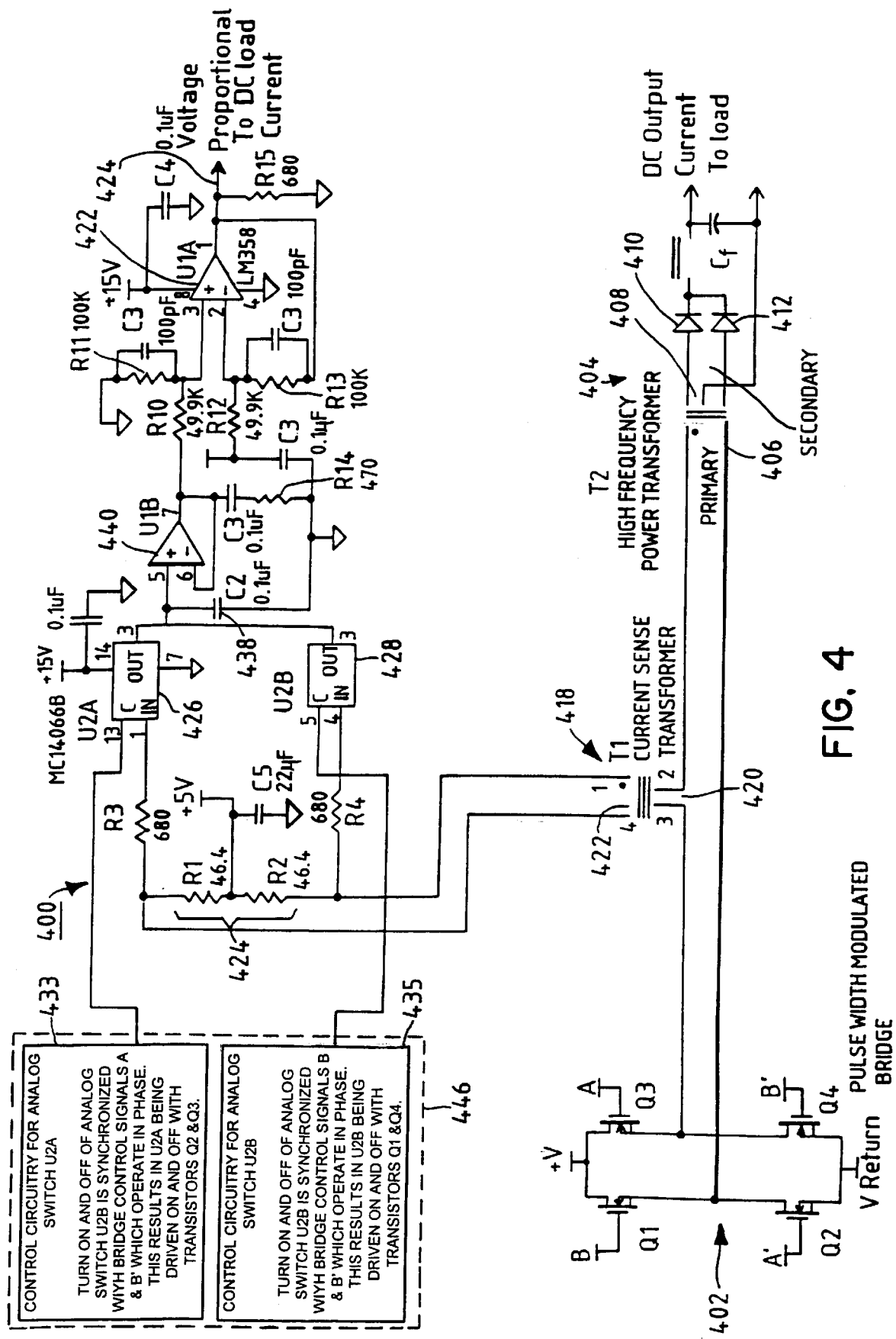
FIG. 4 is a schematic illustration of still another power supply circuit constructed in accordance with the teachings of the invention and having control circuitry for DC output current measurement that is synchronized with bridge control signals for a pulse width modulated bridge.
Figure 6:
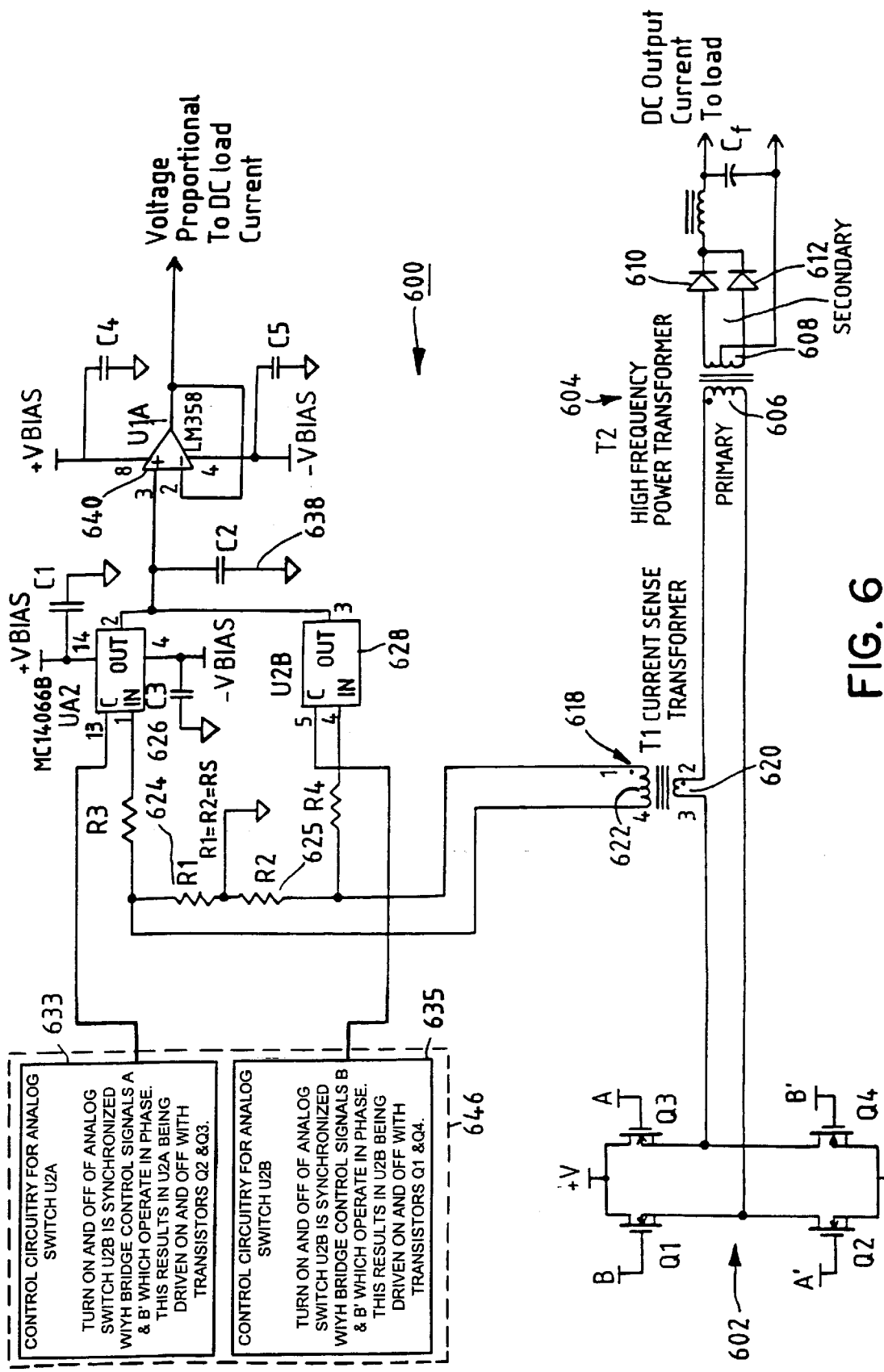
FIG. 6 is a schematic illustration of another power supply circuit constructed in accordance with the teachings of the invention.

FIG. 4 generally illustrates another power supply circuit 400 constructed in accordance with the teachings of the invention. Circuit 400 includes circuitry for measuring the DC output load current with a current sense transformer 418 placed in series in the connection between a pulse-width modulated bridge 402 and a primary winding 406 of a high frequency power transformer 404. Similar to the circuit disclosed in FIG. 2, the power supply circuit 400 includes a sense resistance 424 comprising resistors R1 and R2 (each equal to the same value and also each denoted as sense resistance $R_s$), analog switching devices 426, 428, an averaging and holding circuit including operational amplifier 440, capacitor 438, resistors R3 and R4 and a differential amplifier 422 used to remove an offset DC five volts (used when a negative voltage supply is not available).

The pulse-width modulated bridge 402 includes switching field effect transistors Q1, Q2, Q3, and Q4. The transistors Q2 and Q3 are driven by bridge control signals A and A', which operate in phase. Alternately, transistors Q1 and Q4 are driven by bridge control signals B and B', which are in phase, but out of phase with control signals A and A' by a prescribed amount in order to achieve a desired duty cycle. The circuit 400 further includes an analog switch control circuit 446 having control circuitry 433 and 435 that respectively turn on and off analog switches 426, 428. The control circuitry 433 that switches analog switch 426 is synchronized with bridge control signals A and A', which, when driving transistors Q2 and Q3 to the "on" state, deliver a positive voltage to the dot terminal of the primary winding 406. Hence, analog switch 426 is switched on since a positive voltage at the dot terminal of the primary winding 406 induces a current from terminal 4 of the secondary winding 422 of the current sense transformer 418 creating a positive voltage at the junction of resistors R1 and R3, which is input to the analog switch 426. Similarly, when control signals B and B' drive transistors Q1 and Q4 to the on state, the voltage is reversed and a positive voltage results at the junction of resistors R2 and R4, thereby necessitating switching of switch 428 by control circuitry 435, which is synchronized with bridge control signals B and B'. In an embodiment, the control circuits 433 and 435 may include either opto-couplers or pulse transformers (not shown) that receive timing signals from the bridge gate drive circuits. From this timing information the control circuits 433 and 435 correspondingly generate logic level drive voltages to operate analog switches 426 and 428.

In operation, the circuit 400 initially has a positive voltage delivered to primary winding 406 due to the driving on of transistors Q3 and Q2 by bridge control signals A and A' at time $t_0$. As shown in FIG. 5B the voltage across the primary winding 406 of the transformer 404 is initially positive at the dot terminal of the primary winding 406. Additionally, as shown in FIG. 5A, the primary winding current is positive into the dot terminal. The current induced in the secondary winding 422 of the current sense transformer 418 is essentially the same waveform as the current in the primary winding 406 of the transformer 404. Accordingly, the voltage wave form across resistance R1 mirrors the current in the primary winding 406 as shown in FIG. 5C. Since the voltage is positive across resistor R1 from time $t_0$ to time $t_1$ it is desirable to have the analog switch 426 turned on to average and hold this voltage with the averaging and holding circuit comprised, in part, of resistor R3, capacitor 438 and operational amplifier 440. Accordingly, control circuitry 433 issues a gate signal to the control input of analog switch 426 as illustrated by FIG. 5E. This signal is in synchronization with the bridge control signals A and A' which drive transistors Q2 and Q3 during the period from $t_0$ to $t_1$.

At time $t_1$ the bridge control signals A and A' cease and the transistors $Q_2$ and $Q_3$ are switched off thereby preventing voltage to be delivered to the transformer 404. However, as shown in FIG. 5B ringing in the primary of the transformer occurs after the transistors Q2 and Q3 are switched to the off state. Analog switch 426 is turned off at time $t_1$ to allow the voltage on capacitor 438 to be held.

At time $t_2$ transistors Q1 and Q4 of the pulse-width modulated bridge 402 are switched on to deliver voltage at the non-dot terminal of the primary coil 406. Thus as shown in FIG. 5B, the voltage across the primary winding 406 becomes negative as does the current in the primary coil 406 as illustrated in FIG. 5A. Likewise, the current in the secondary winding 422 of the current sense transformer 418 reverses causing the voltage at R1 to decrease below the five volt biased level and the voltage at resistor R2 to then increase above the five volt biased level. Accordingly, the voltage at resistance R2 is switched via analog switch 428 to the averaging and holding circuit comprised, in part, of operational amplifier 440, capacitor 438 and resistor R4. This is accomplished by control circuitry 435, which is in synchronization with the bridge control signals B and B' and which issues a gate signal at time $t_2$ as illustrated in FIG. 5F. The analog switch 428 remains in the on state until time $t_3$ when the bridge B and B' drive the transistors Q1 and Q4 to the off state. Thus, no further power is transferred from the primary to secondary coils of the power transformer 404. At this point, the analog switch 428 must be turned off to allow the voltage at capacitor 438 to be held. Finally, at time $t_4$ the first cycle ends and a subsequent cycle begins and the process repeats, accordingly.

In the situation where both positive and negative voltage sources are available to drive the analog switches in the current measurement circuit, the need for a five volt bias voltage in the sensing resistance $R_s$ portion of the circuit is no longer needed. Hence, the system 600 shown in FIG. 6 merely requires a ground connection at the junction of resistors R1 and R2. In the particular circuit 600 illustrated in FIG. 6, the power source is a pulse-width modulated bridge 602 and the analog switch control circuit 646 includes control circuitry 633 and 635 driving the analog switches 626, 628. The control circuitry 633, 635 is synchronized with the pulse-width modulated bridge control signals. Persons of ordinary skill in the art will appreciate that the system of FIG. 6 may also be utilized with a phase-shifted, zero voltage transition bridge as shown in FIG. 2 in place of a pulse width modulated bridge and, therefore, may also utilize a one-turn sense winding in this instance on the primary 606 of the transformer 604 along with a rectifier circuit similar to control circuit 246 shown in FIG. 2 in order to effect switching of the analog switches.

In the system 600, the voltage created across the resistors 624 and 625 (i.e., R1 & R2) due to the induced current in the secondary winding 622 of the current sense transformer 618 alternates in polarity between the two ends of the resistors 624 and 625 (i.e., R1 & R2). Thus, during a period of current flow from terminal 4 to terminal 1 of the current sense transformer 618, the analog switch 626 is switched on to allow the voltage at the junction of resistors R1 and R3 to be averaged and held by the operational amplifier 640, capacitor 638 and resistor R3. In the next half-cycle, when current reverses in the secondary winding 622 of the current sense transformer 618, the analog switch 628 is turned on since the voltage is now reversed across resistor 624. The voltage present at the junction of resistors R2 and R4 is delivered through switch 628 to the averaging and holding circuit for output by operational amplifier 640 that yields a voltage proportional to the DC 5 load current. The voltage output by the operational amplifier 640 is related to the DC output current of the high frequency power transformer 604 by the following transfer function of output voltage (V) of the current measurement circuit divided by the current ($I_o$) output on the secondary winding of the transformer 604:

$$V/I_o = n_1 \cdot n_2 \cdot R_s$$

Where $n_1$ is the ratio of the secondary number of windings to the primary of windings in the high frequency power transformer 604, $n_2$ is equal to the ratio of the primary number of turns in the primary 620 of the current sense transformer 618 to the number of secondary windings in the secondary winding 622 of the current sense transformer 618, and the resistance $R_s$ is equal to either resistor R1 (624) or R2 (625) which are of equal value. Since both positive and negative voltage sources are available in the circuit of FIG. 6, a differential amplifier is no longer needed to remove the introduced bias voltage present in the circuits of FIGS. 2 and 4.

The above-described circuits achieve accurate measurement of true DC load current in a switching power supply, yet with economical components. The use of a current transformer on the primary side of a high frequency power transformer having its output sampled and averaged during the interval that power is transferred through the power transformer to the load serves to cancel the effects of magnetizing current in the high frequency power transformer. This mitigation of the effects of magnetizing current allow the disclosed circuits to accurately measure output DC current in all conditions such as duty cycle changes and light load conditions.

From the foregoing, persons of ordinary skill in the art will appreciate that the disclosed circuits 200, 400, 600 only sample and average the primary current of a high frequency power transformer during an interval in which power is transferred through the transformer to the load. Averaging of the primary current during the period of power transfer affords the advantage of canceling the effects of magnetizing current in the transformer. The averaged value is then held until a next sampling interval of power transfer (i.e., the next half-cycle in a duty cycle). A further beneficial effect of such current detection is that duty cycle changes of the switched power supply have no effect on the accuracy of the measurement since sampling occurs only during those periods of the duty cycle when power is transferred to the load. This results in a signal that is directly proportional to the DC load current over the full load range of the power supply without the need for a shunt resistor or other transducers such as a Hall-effect transducer in the output circuit of the power supply.

The above method of measuring output current may be implemented with an apparatus employing an inexpensive current transformer connected on the primary side of the high frequency power transformer. Hence, the disclosed circuits provide accurate current measurement with lower cost and reduced size components.

Although certain methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use with a first transformer having a primary winding for receiving a switched input voltage and a secondary winding outputting a secondary winding output, an apparatus for sensing current of the secondary winding output, comprising:

a second transformer having first and second windings, the first winding operatively coupled with the primary winding of the first transformer;

a resistance in circuit with the second winding of the second transformer;

at least two switching devices, each of the switching devices having a first input in circuit with the resistance and a control input for receiving a switching control signal;

a control circuit in circuit with the control inputs of each of the at least two switching devices to alternately switch the switching devices between on and off states according to a predetermined switching sequence; and an averaging circuit in circuit with the at least two switching devices, the averaging circuit being configured to average a voltage across the resistance.

2. An apparatus as defined in claim 1, wherein the resistance comprises at least two resistors connected in series, the series connection of the at least two resistors having first and second ends, where an input of one of the at least two switching devices is connected to the first end and an input of another one of the at least two switching devices is connected to the second end.

3. An apparatus as defined in claim 1, wherein the at least two switching devices comprise analog CMOS switches.

4. An apparatus as defined in claim 1, further comprising a sense winding magnetically coupled to the primary winding; and wherein the control circuit further comprises a rectifier circuit connected to the sense winding, the rectifier circuit having at least two outputs, each of the at least two outputs being connected to a corresponding input of one of the switching devices.

5. An apparatus as defined in claim 4, wherein the rectifier comprises a full-wave bridge rectifier which alternately outputs a positive voltage on the at least two outputs during respective alternate periods of power transfer between the primary and secondary windings of the first transformer.

6. An apparatus as defined in claim 1, further comprising a switching power supply coupled to the primary winding of the first transformer, the switching power supply supplying the switched input voltage.

7. An apparatus as defined in claim 6, wherein the switching power supply comprises a phase-shifted, zero-voltage transition bridge.

8. An apparatus as defined in claim 6, wherein the switching power supply comprises a pulse-width modulated power supply.

9. An apparatus as defined in claim 8, wherein the pulse-width modulated power supply has at least two alternating control signals and the control circuit issues control signals to the at least two switching devices in synchronization with the at least two alternating control signals of the pulse-width modulated power supply.

10. An apparatus as defined in claim 1, wherein the averaging circuit further comprises:
    an operational amplifier having an input and an output;
    at least one resistor; and
    a capacitor having an end connected to the at least one resistor and the end also connected to the input of the operational amplifier for holding the averaged voltage.

11. An apparatus as defined in claim 10, wherein the operational amplifier outputs a voltage proportional to a current present on the secondary winding of the first transformer based on a predetermined relationship.

12. An apparatus as defined in claim 11, wherein the predetermined relationship is:

$$V/I_o = n_1 \cdot n_2 \cdot R_s$$

where V is a voltage on the output of the operational amplifier, $I_o$ is the current present on the secondary winding of the first transformer, $n_1$ is a first turns ratio of the first transformer, $n_2$ is a second turns ratio of the second transformer and $R_s$ is a resistance value of the resistance.

13. An apparatus as defined claim 12, wherein the first turns ratio is a quotient of a number of turns in the secondary winding of the first transformer divided by a number of turns in the primary winding of the first transformer; and
    the second turns ratio is a quotient of a number of turns in the first winding of the second transformer divided by a number of turns in the second winding of the second transformer.

14. A method for sensing current of a secondary winding output of a power transformer having a primary winding for receiving a switched input voltage and a secondary winding outputting the secondary winding output, the method comprising the steps of:
    measuring a current on the primary winding of the power transformer with a current transformer having a first winding operatively coupled with the primary winding;
    generating a voltage across a resistance in circuit with a second winding of the current transformer, the generated voltage being proportional to the current measured in the primary winding;
    averaging the voltage generated across the resistance during periods when power is transferred from the primary winding to the secondary winding;
    holding the averaged voltage for a period of no power transfer between the primary and secondary windings of the power transformer; and
    outputting the averaged voltage, the averaged voltage being proportional to a current output on the secondary winding of the power transformer according to a prescribed relationship.

15. A method as defined in claim 14, wherein the step of averaging the voltage generated across the resistance includes selectively switching the voltage across the resistance to an averaging circuit during the period when power is transferred from the primary winding to the secondary winding.

16. A method as defined in claim 14, further comprising the step of:
    determining the periods when power is transferred from the primary winding to the secondary winding by monitoring voltage on the primary winding.

17. A method as defined in claim 14, wherein the prescribed relationship is:

$$V/I_o = n_1 \cdot n_2 \cdot R_s$$

where V is a voltage on the output of the operational amplifier, $I_o$ is the current present on the secondary winding of the first transformer, $n_1$ is a first turns ratio of the first transformer, $n_2$ is a second turns ratio of the second transformer and $R_s$ is a resistance value of the resistance.

18. A method as defined in claim 14, wherein the voltage across the resistance is selectively switched based on a pulse-width modulated signal driving a pulse-width modulated bridge that supplies power to the power transformer.

19. An apparatus for sensing current in a circuit comprising:
    a switching power supply circuit;
    a power transformer in circuit with the switching power supply, the power transformer having a primary winding and a secondary winding;
    a current transformer operatively coupled to the primary winding of the power transformer, the current transformer having first and second windings;
    a resistance connected across the second winding of the current transformer;
    first and second analog switches, each of the analog switches having a corresponding first input in circuit with the resistance, a control input for receiving a switching control signal and an output for selectively outputting a value received at the input when the analog switch is in an on state;
    a control circuit in circuit with the control inputs of the two analog switches to alternately switch the analog switches between on and off states dependent on a particular state of a voltage present across the resistance; and
    an averaging circuit in circuit with the two analog switches, the averaging circuit being configured to average the voltage across the resistance during portions of a cycle of the switching power supply when power is transferred and to hold the average voltage during portions of a cycle when power is not transferred.

20. An apparatus as defined in claim 19, wherein the resistance comprises at least two resistors connected in series, the series connection of the at least two resistors having first and second ends, where an input of one of the first and second analog switches is connected the first end and an input of the other of the first and second analog switches is connected to the second end.

21. An apparatus as defined in claim 19, wherein the first and second analog switches comprise CMOS switches.

22. An apparatus as defined in claim 19, further comprising a sense winding magnetically coupled to the primary winding; and wherein the control circuit further comprises a rectifier circuit connected to the sense winding, the rectifier circuit having first and second outputs, the first output being connected to an input of one of the first and second analog switches and the second output being connected to another one of the first and second analog switches.

23. An apparatus as defined in claim 22, wherein the rectifier comprises a full-wave bridge rectifier which alternately outputs a positive voltage on the first and second outputs during corresponding alternating periods of power transfer between the primary and secondary windings of the power transformer.

24. An apparatus as defined in claim 19, wherein the switching power supply comprises a phase-shifted, zero-voltage transition bridge.

25. An apparatus as defined in claim 19, wherein the switching power supply comprises a pulse-width modulated bridge.

26. An apparatus as defined in claim 25, wherein the pulse-width modulated bridge has at least two alternating control signals and the control circuit issues control signals to the first and second control inputs of the analog switches in synchronization with the at least two alternating control signals of the pulse-width modulated bridge.

27. An apparatus as defined in claim 19, wherein the averaging circuit further comprises:

an operational amplifier having an input and an output; and an operational amplifier having an input and an output;

at least one resistor; and a capacitor having an end connected to the at least one resistor and the end also connected to the input of the operational amplifier for holding the averaged voltage.

28. An apparatus as defined in claim 27, wherein the operational amplifier outputs a voltage proportional to current on the secondary winding of the power transformer based on a predetermined relationship.

29. An apparatus as defined in claim 28, wherein the predetermined relationship is:

$$V/I_o = n_1 \cdot n_2 \cdot R_s$$

where V is a voltage on the output of the operational amplifier, $I_o$ is the current present on the secondary winding of the first transformer, $n_1$ is a first turns ratio of the first transformer, $n_2$ is a second turns ratio of the second transformer and $R_s$ is a resistance value of the resistance.

30. An apparatus as defined in claim 29, wherein the first turns ratio is a quotient of a number of turns in the secondary winding of the power transformer divided by a number of turns in the primary winding of the power transformer; and the second turns ratio is a quotient of a number of turns in the first winding of the current transformer divided by a number of turns in the second winding of the current transformer.

* * * * *